May 24, 1927.
C. A. KOTHE
1,629,578
AUTOMATIC TRAIN PIPE CONNECTER
Filed Sept. 19, 1921  2 Sheets-Sheet 1
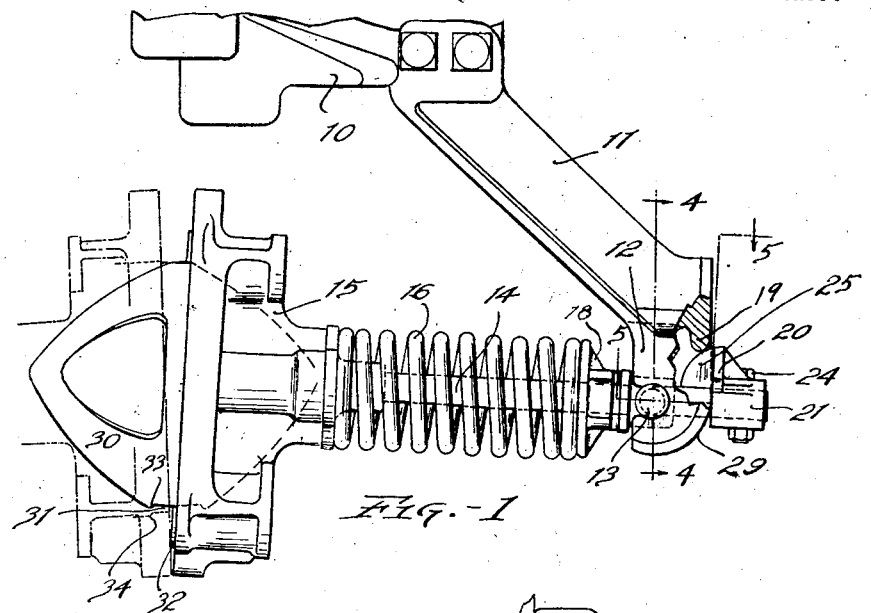
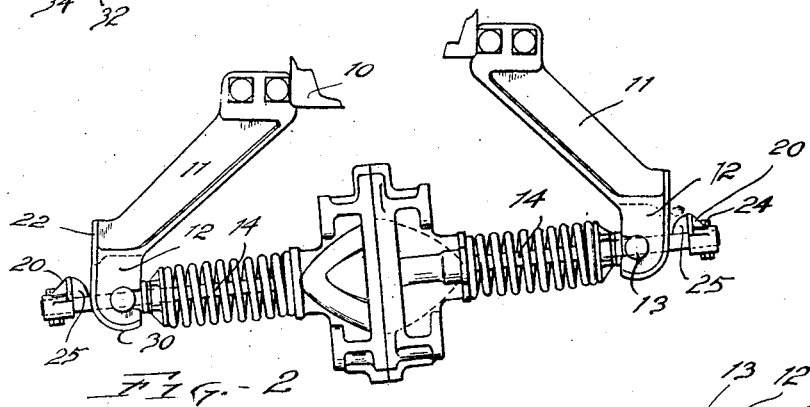
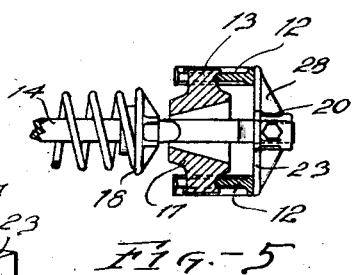
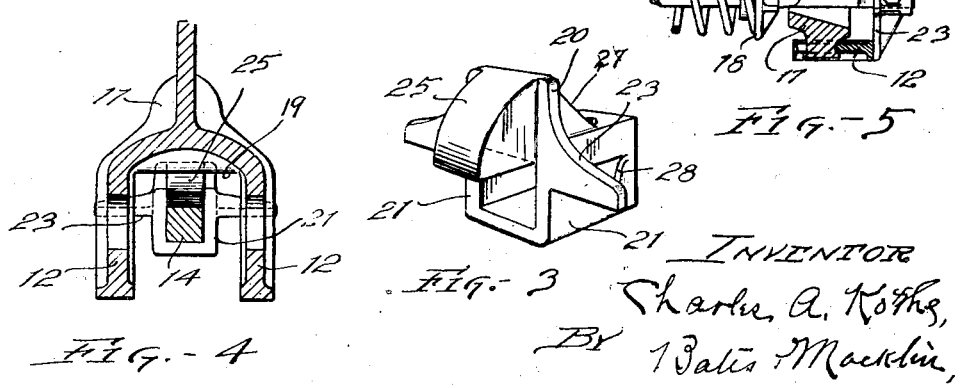

May 24, 1927.
C. A. KOTHE
1,629,578
AUTOMATIC TRAIN PIPE CONNECTER
Filed Sept. 19, 1921  2 Sheets-Sheet 2
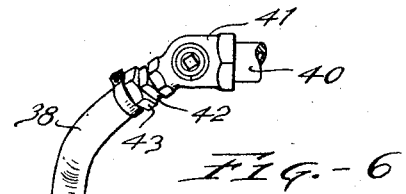
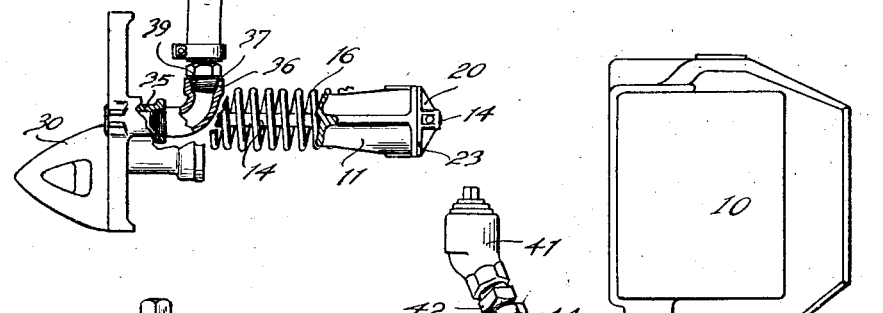
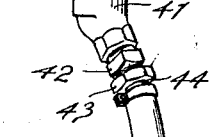
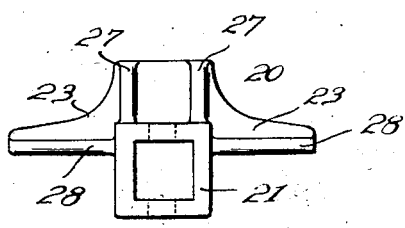
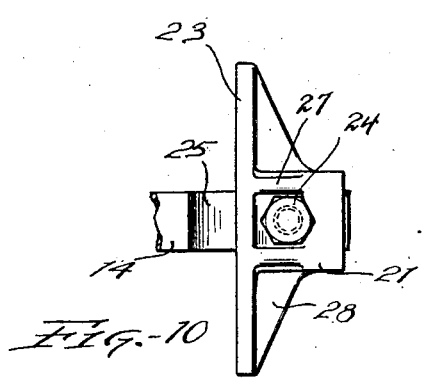

Patented May 24, 1927.

1,629,578

UNITED STATES PATENT OFFICE.

CHARLES A. KOTHE, OF EAST CLEVELAND, OHIO, ASSIGNOR, BY MESNE ASSIGNMENTS, TO MARTIN A. BARBER, OF CLEVELAND HEIGHTS, OHIO.

AUTOMATIC TRAIN-PIPE CONNECTER.

Application filed September 19, 1921. Serial No. 501,529.

This invention relates to automatic train pipe connecters of the type wherein there is a connecter head having a shank supported by a bracket in such manner that it may have universal movement laterally and also slide longitudinally. With such an automatic connecter, it is necessary to support the head, when uncoupled, in a position to readily engage the corresponding head of another coupler, a usual means for so supporting the head being to provide a projection on the shank adapted to engage the bracket.

One of the objects of this invention is to so form the projection on the shank and the corresponding bracket surface which it engages that the head will be brought into the desired position when the car is uncoupled irrespective of the position it has when coupled and will be so supported against accidental displacement, while on the other hand it is free to be moved in any direction as the coupling takes place, and when coupled the projection is entirely free from the bracket. My construction is simple, efficient and durable, and designed to come into engagement without excessive wear.

A further object is to so form the projection that it will without jar effectively and automatically tip the shank from any coupled position as may be necessary to lift the connecter head just as the same is being uncoupled, whereby a lock on the lower portion of the head may be released before the actual separation of the heads takes place.

Another object of the invention is to provide a hose connection to the coupler in such manner that it will not be loosened by the various movements of the coupler in use.

Further objects of the invention will be apparent from the following description taken in connection with the accompanying drawings wherein Fig. 1 is an elevation of a connecter embodying features of my invention; Fig. 2 is an elevation of two connecters coupled together, illustrating the positions when one coupler is higher than the other. Fig. 3 is a perspective view of the stop block constructed according to my invention; Fig. 4 is a section taken on the line 4—4 in Fig. 1. Fig 5 is a cross section through the universal joint taken on the line 5—5 in Fig. 1; Fig. 6 is a sectional plan of my connecter showing one of the hose connections—in this instance the steam pipe; Fig. 7 is a front elevation of the connecter, the supporting car coupler and the steam pipe; Fig. 8 is a detail partly in section of the universal coupling connecting the steam hose with a pipe carried by the car; Fig. 9 is a rear elevation of the stop block carried by the coupler shank; Fig. 10 is a plan view of such stop block.

In Figures 1, 2 and 6, I have indicated a car coupler 10 having a bracket 11 secured to and depending therefrom. The bracket is provided with spaced arms 12 having forwardly facing notches which support trunnions 13 of a pivot block 17 in which is slidably mounted the connecter shank 14. A connecter head 15 is secured to the forward end of the shank 14. Around the shank is a compression spring 16. This spring is compressed between the rear face of the head and a block 18 which slidably surrounds the shank and bears against the front face of the trunnion block. The spring seat block may have a pivotal bearing on a vertical axis with the trunnion block and the trunnion block may have a laterally flaring opening for the shank, as shown in Fig. 5 and as claimed in Patent No. 1,347,986, granted July 27, 1920, to The American Automatic Connector Company as assignee of M. A. Barber.

The mechanism for maintaining the connecter head in proper position, both vertically and horizontally, when uncoupled is embodied in a stop block, indicated generally at 20, which is secured to the rearward portion of the shank 14 and is arranged to co-operate with an under surface of the bracket between the arms 12 in a manner which will be now described.

The block 20, which is preferably a casting, has a suitable sleeve-like portion 21 preferably square to embrace the shank 14 and has wings 23 extending from opposite sides of the sleeve like portion and adapted to engage the rear edges of the bracket arms 12, and has a centrally positioned cam 25 on the forward face of the block and above the shank opening. This cam is in the form of a partially cylindrical segment with its curved portion facing upwardly and forwardly. It is preferably about the width of the shank; it co-operates with a transverse web 19 on the bracket between the arms 12.

Any suitable means may be employed for fastening the block to the shank. I prefer to use a bolt 24 passing through vertical openings on the block sleeve and shank. The head of this bolt preferably lies between webs 27 on the rear face of the stop block, these webs preventing the bolt rotating so that a nut may be readily screwed onto the lower end of the bolt; the webs likewise stiffen and strengthen the block. Other webs 28 extend laterally from the sleeve portion and brace the wings of the block. This web construction enables the block to be comparatively light and at the same time very strong.

The portion of the bracket which co-operates with the cam 25 may be rounded to provide a smooth acting wearing surface between the engaging faces. In normal uncoupled position the force exerted by the spring 16 holds the bearing wings 23 on the stop block in engagement with the plane bearing surface on the bracket; while the weight of the head swings the stem 14 about its pivot 13 and thus urges the cam 25 into engagement with the bearing surface 19.

The operation of the described feature of my device is as follows: Assuming that a connecter is assembled and in an uncoupled position with the stop block bearing against the bracket, as shown in Fig. 1: When in this position the head is free to be raised by moving it about the trunnion 13 by reason of the fact that the bearing surfaces 20 move around the curved bracket portion 29 without compressing the spring 16. If the head is urged downwardly from the normal position, however, then the cam 25 rides upwardly on the surface 19. As the head is lowered the spring 16 is compressed and the shank 14 moved rearwardly through the trunnion block. When the head moves laterally, one or the other of the wings 23 engages the bracket and thus causes the stop block to compress the spring.

It will be seen that the arrangement of the wings and cam projection hold the uncoupled connecter head in a definite position while allowing it to move freely in the upward direction (gravity alone being sufficient to prevent inadvertent upward displacement) and to move by constraining the spring either downwardly or toward either side. This insures each uncoupled head being held in the desired position for ready coupling with a head on another car while enabling the head to swing as may be necessary when the cars are coupled on a curve or are otherwise out of alignment.

It should be noted that the cam 25 is very materially narrower than the space between the bracket arms, thus allowing for any desired lateral movement during coupling or uncoupling irrespective of the position of the head. As it is uncoupled, the projection under the force of the spring results in immediately bringing the connecter into the position shown in Fig. 1. When coupled, the projection is entirely free from the arms, as shown in Fig. 2.

The connecter head shown, is of the type wherein there is an approximately conical projection 30 on one side of the head and a recess 31 on the other side (Fig. 7) adapted to mate respectively with a similar recess and projection on the other head. To prevent excessive steam pressure at the orifice 32 near the lower end of the head from inadvertently separating the heads, a very effective lock has been provided, shown, described and claimed in Patent No. 1,518,380, issued December 9, 1924, to the American Automatic Connector Company, as assignee of M. A. Barber. This lock, as indicated in Fig. 1, comprises a shoulder 33 on the projection 30, and a shoulder 34 at the base of the opening 31. These shoulders are normally free from each other when the heads are coupled. When the cars are uncoupled, the heads remain in contact until the cars have slightly separated and the projections on the rear of the shank come into engagement with the brackets. This engagement tips the shanks and slightly raises the heads, tipping them apart as shown in Fig. 1, thus allowing the head 30 to pass freely out of the opening 31 without the projection 33 dragging on the wall at the bottom of the opening 31.

While the combination of the interlocking shoulders and projections formed to tip the heads is broadly the invention of M. A. Barber, the specific form of projection shown herein is particularly well adapted to accomplish the result irrespective of the position of the heads and shanks at the time of uncoupling. It will be noticed that the lower edge of the wings 23 is above the center line of the shank, so that with the coupled connecters lying in the vertical, central longitudinal plane of the cars and extending horizontally, as usual, or one of them extending downwardly (as illustrated in Fig. 2), both, or at least one, of the cams 25 will engage the associated web 19 during the uncoupling before the wings engage the rear edge of the associated bracket, thus enabling the cam to bring the head into exactly the position desired. On the other hand if the shank happens to be deflected laterally at the time of uncoupling, the wing which first comes into engagement with the bracket, does so above the plane through the center of the shank and thus tends to raise the connecter head.

It will be seen that with my device, irrespective of the position of the connecters as they are uncoupled, the proper tipping necessarily results just before the heads pull apart, thereby raising the upper locking shoulder so that it cannot drag against the lower shoulder during separation. Furthermore, it is impossible for the cam or wings of my device to engage any outside corner of the bracket and cause the uncoupled connecter to stick in some undesired abnormal position.

Another advantageous characteristic of my cam projection is that it prevents the uncoupled head from sagging, even if the spring should materially weaken in use. In the continued use of connecters it sometimes happens that the spring gradually weakens, and with a stop or projection engaging a vertical rear face of the bracket and being held there against by the frictional resistance between the bracket and stop caused by the force of the spring, this weakening of the spring is liable to result in a sagging of the connecter head when uncoupled. With my construction, however, by reason of the cam engaging beneath a web on the bracket, such weakening of the spring is immaterial, as a much lighter spring than that installed on the connecter is sufficient to maintain the wedge-shaped cam in position. It should also be noticed that with my construction when the cam wears in use it simply slides a trifle farther forward and does not change its characteristic action of properly supporting the head.

Another feature of my invention relates to the provision for preventing the continual movement of the coupler in use from loosening a connected hose. As the principal difficulty has occurred in connection with the steam hose, my improvement is shown and described with reference to it. As shown more particularly in Figs. 6 and 7, the steam orifice 32 of my connecter is at the mouth of a rigid conduit 35 into which is tightly threaded a fixed elbow 36 having a threaded end 37. The hose 38 has a nipple 39 which engages this elbow by a screw thread. The flexibility of the hose allows the connecter head to move in any direction as desired. At the same time this movement cannot work the screw threaded connection loose, as the tendency of the hose against being twisted effectually prevents this.

At its upper end the hose is connected by a universal coupling to the train steam pipe. This pipe 40 is shown as provided with an angle cock 41 which is engaged by a threaded nipple 42 connected by a screw threaded flanged collar or universal coupling 43 with a flanged nipple 44 on the hose pipe. Notwithstanding the play of the lower end of the hose as the coupler moves either vertically or laterally, there is no movement of the upper end of the hose and no tendency of it to work the universal coupling loose, the flexibility of the hose taking up the movement communicated to its lower end.

Heretofore it has been customary to couple the steam hose to the connecter head by a universal joint adjacent to the connecter head. I have found that the continual movement of the connecter head has a tendency to gradually work the coupling loose. By providing a rigid elbow, however, at the connecter, and placing the universal coupling at the upper end of the hose, I entirely obviate the difficulty. The hose may be readily installed, its lower nipple being simply screwed to the connecter elbow when the hose is straight and projecting laterally, and thereafter the hose is bent and the universal coupling at its upper end connected with the train pipe.

Having thus described my invention, I claim:—

1. In an automatic train pipe coupling, a supporting bracket having spaced arms depending therefrom, a coupling head having a shank thereon, and a stop block on said shank having wings to engage the rear edge of the arms, the lower edge of said wings being above the center line of the shank.

2. In an automatic train pipe coupling, a supporting bracket having spaced arms depending therefrom, a coupling head having a shank thereon, and a stop block on said shank having a cam to engage an under surface of the bracket between the arms and lateral wings the lower edge of which lie above the central line of the shank.

3. In an automatic train pipe coupling, a bracket having spaced arms, a coupling head having a shank extending between said arms, a stop block mounted on the shank and having a forwardly facing cam adapted to engage an under surface of the bracket intermediate said arms, and lateral wings on the block, the lower edges of which are above the central line of the shank.

4. In an automatic train pipe coupling, a bracket having spaced arms depending therefrom, a coupling head having a shank extending between said arms, a stop block adjacent the rear end of the shank and a forwardly facing cam positioned on said block, and having a flat under face engaging the top of the shank, said cam being adapted to engage an under surface of the bracket intermediate said arms, and wings on the block adapted to engage the rear edges of said arms, said wings having their lower edges lower than the bottom of the cam and higher than the central line of the shank.

5. A stop block for an automatic train pipe coupling comprising a hollow body having a passageway therethrough, and having a wing positioned on each side of the passageway, the lower edges of the wings being above the central line of the passageway.

6. A stop block for an automatic train pipe coupling comprising a hollow body having a passageway therethrough, a wing positioned on each side of the passageway and each having the lower edges thereof above the center of the passageway and a cam on said body projecting beyond the forward end thereof.

7. A stop block for an automatic train pipe coupling comprising a body having a cam projecting beyond the forward face thereof, said cam comprising a substantially cylindrical segment.

In testimony whereof, I hereunto affix my signature.

CHARLES A. KOTHE.